(12) United States Patent
Choi (10) Patent No.: US 12,428,327 B2
(45) Date of Patent: Sep. 30, 2025

(54) DEVICE FOR DISSOLVING GAS IN LIQUID

(71) Applicant: Bong Eui Choi, Jeonju-si (KR)

(72) Inventor: Bong Eui Choi, Jeonju-si (KR)

( * ) Notice: Subject to any disclaimer, the term of this patent is extended or adjusted under 35 U.S.C. 154(b) by 436 days.

(21) Appl. No.: 18/044,103

(22) PCT Filed: Sep. 6, 2021

(86) PCT No.: PCT/KR2021/012036
§ 371 (c)(1),
(2) Date: Mar. 6, 2023

(87) PCT Pub. No.: WO2022/055200
PCT Pub. Date: Mar. 17, 2022

(65) Prior Publication Data
US 2023/0373825 A1    Nov. 23, 2023

(30) Foreign Application Priority Data
Sep. 8, 2020   (KR) ................. 10-2020-0114335

(51) Int. Cl.
*C02F 1/72* (2023.01)

(52) U.S. Cl.
CPC ........ *C02F 1/727* (2013.01); *C02F 2201/002* (2013.01); *C02F 2209/03* (2013.01); *C02F 2209/225* (2013.01)

(58) Field of Classification Search
CPC  C02F 1/727; C02F 2201/002; C02F 2209/03; C02F 2209/225; B01F 2101/14; B01F 23/2322; B01F 23/2323; B01F 23/2341; B01F 23/2362; B01F 23/2363; B01F 23/2364; B01F 25/3121; B01F 25/3141; B01F 25/4231; B01F 25/4331; B01F 25/53; B01F 23/237612; B01F 23/29; B01F 35/53; B01F 35/55; B01F 35/561;
(Continued)

(56) References Cited

FOREIGN PATENT DOCUMENTS

| KR | 10-0484256 B1 | 4/2005 |
| KR | 10-0638799 B1 | 10/2006 |
| KR | 10-0638812 B1 | 10/2006 |

(Continued)

*Primary Examiner* — Ekandra S. Miller-Cruz
(74) *Attorney, Agent, or Firm* — NKL Law; Jae Youn Kim (57) ABSTRACT

A gas-dissolving device can dissolve a gas in a liquid at a high concentration, and can maintain the concentration of a dissolved gas even in a state in which a circulation operation has been stopped. The gas-dissolving device of the present invention comprises: a dissolving tank for receiving a liquid and a gas from each of a circulation pump and a gas source, and discharging a liquid/gas mixture with an increased dissolved gas concentration in the liquid; and a pressurization dissolving part which is fluidically connected to the dissolving tank, and which has a wound coil portion or a plurality of bent portions to further increase the concentration of the dissolved gas, and thus discharge a high-concentration-gas solution. The dissolving tank includes: a plurality of dispersing trays, which are each formed in a shape of having an inclined surface extended in the outer downward direction; and a plurality of water-collecting trays, which are each formed in a shape of having an inclined surface extended in the inner downward direction and each have a through-hole formed at the lower end thereof, wherein the plurality of dispersing trays and the plurality of water-collecting trays are alternately arranged in the vertical direction.

10 Claims, 6 Drawing Sheets

(58) Field of Classification Search
CPC ... B01F 35/71; B01F 2101/305; B01F 2101/48;
Y02W 10/10
USPC ......................................................... 210/758
See application file for complete search history.

(56) References Cited

FOREIGN PATENT DOCUMENTS

| | | |
|---|---|---|
| KR | 10-0852936 B1 | 8/2008 |
| KR | 10-2010-0038532 A | 4/2010 |
| KR | 10-2236732 B1 | 4/2021 |

DEVICE FOR DISSOLVING GAS IN LIQUID

TECHNICAL FIELD

The present invention relates to apparatus for dissolving gas in liquid, and more particularly to an apparatus capable of dissolving gas up to supersaturation concentration using a physical mechanism without an electrochemical catalyst or an additive and maintaining a dissolved state without degassing for a long time under a normal pressure condition.

BACKGROUND ART

There are many fields using water having oxygen dissolved therein. For example, an oxygen dissolution apparatus is widely utilized in a biological wastewater treatment plant that decomposes organic matter using microorganisms, a fish farm, hydroponics, etc.

It is known that drinking oxygenated water having a large amount of dissolved oxygen contained therein is good for human health. That is, when people drink supersaturated dissolved oxygenated water having more than a predetermined level of dissolved oxygen concentration as a method of obtaining oxygen deficient in breathing, blood oxygen concentration is increased and metabolism is improved, whereby they obtain various results beneficial to health. For example, for an athlete, athletic ability is improved without increasing the pulse rate by lung function bypass, muscular strength and endurance are increased, the cardiopulmonary function is improved, and fatigue recovery is accelerated. Since some of oxygen introduced into blood through oxygenated water can be supplied to the brain, the oxygenated water is also useful to improvement in cognitive power and concentration of students or researchers who perform lots of intellectual activity. Meanwhile, it is known that high-concentration oxygenated water has therapeutic effects in brain disease patients who suffer from oxygen deficiency.

The inventor of the present application has paid attention to coronavirus disease 19 (COVID-19) in connection with the oxygenated water. It is known that new types of coronavirus cause lung injury of an infected person and bring about hypoxia due thereto (Wei-Haas M., "They don't struggle to breathe—but COVID-19 is starving them of oxygen", National Geographic, 2020.5.8. Internet address: https://www.nationalgeographic.com/science/2020/05/they-do-not-struggle-tobreathe-but-coronavirus-starves-them-of-oxygen-cvd/). When critically ill patients or moderate patients who cannot normally perform gas exchange in alveoli due to lung injury drink high-concentration oxygenated water in addition to using oxygen respirators, this will be great help in maintenance of bodily function and therapy.

Meanwhile, it is known that about 80% of COVID-19 patients are asymptomatic patients or mild patients and that many of such mild patients may suffer from silent hypoxia that is not revealed through breathing (Rizzo, A., "Silent hypoxia and its role in COVID-19 detection", 2020.6.3., Internet address: https://www.news-medical.net/news/20200603/Silent-hypoxia-and-its-role-in-COVID-19-detection.aspx). If even a mild patient neglects oxygen supplement, whereby blood oxygen saturation is continuously low, metabolism may be slow and bodily organs of the patient, such as the brain, heart, kidneys, and liver, may be injured. Since expensive equipment, such as an oxygen respirator, is not necessary and there is no restriction of activity, the oxygenated water may be an effective way of supplementing mild patients with oxygen.

In order to maintain lives of COVID-19 patients, to maintain the functions of bodily organs, including the brain, and to remedy diseases irrespective of severity, as described above, a method of effectively supplying oxygen into the human body is necessary, and the oxygenated water may be the most efficient alternative thereto.

Various apparatuses for dissolving oxygen in water have been proposed, and conventional art may be generally classified into the following three types.

As a first type of conventional art, there is an aeration system, wherein a diffuser is installed at the bottom of a water tank, and oxygen gas is finely diffused to increase contact area between the oxygen gas and water, which is mainly applied to a fish farm, hydroponics, a biological wastewater treatment plant, etc. This technology is suitable to increasing of deficient oxygen concentration so as to approximate saturation concentration; however, it is difficult to adopt this technology in generating high-concentration oxygenated water having oxygen dissolved therein to a supersaturation level.

As a second type of conventional art, there is a system configured such that a hermetically sealed pressure vessel is filled with water, oxygen microbubbles are injected from a lower end of the vessel in the state in which pressure is applied, and the oxygen microbubbles dwell in a pressurized state for a predetermined time, whereby oxygen in the water is dissolved to a supersaturation level. However, this technology has problems in that a high-pressure vessel, a high-head pump, a high-pressure oxygen tank, etc. are necessary and the oxygen microbubbles must be dwell for a predetermined time, whereby the overall size of an apparatus is increased and continuous production is difficult. In addition, decompression to normal pressure is necessary for dispensing, and rapid degassing occurs during decompression, whereby dissolved oxygen concentration is greatly reduced. In this technology, therefore, it is difficult to obtain ultra-high-concentration oxygenated water having a dissolved oxygen concentration of 150 ppm or more and to apply this technology to small-scale apparatus although it is possible to adopt this technology in oxygenated water beverage factories.

As a third type of conventional art, there is a system configured such that oxygen is injected into a flowing fluid and contact between the water and the oxygen is increased in a dissolution pipe, whereby dissolution efficiency is stably improved. As an example thereof, there is an oxygen dissolution apparatus disclosed in Korean Patent No 10-0638799. In the oxygen dissolution apparatus disclosed in this document, multi-stage flat trays are provided in the dissolution pipe such that a mixture of water and oxygen that falls from each of the trays to a corresponding one of the trays immediately thereunder collides with a mixture of water and oxygen contained in the tray immediately thereunder while being mixed therewith, whereby contact between the water and the oxygen is maximized, and therefore dissolution efficiency is improved. In the apparatus configured to have a structure in which collision between the mixtures of water and oxygen and collision between the mixture of water and oxygen and an internal structural of the apparatus occurs, as described above, however, degassing of dissolved oxygen may be accelerated during collision. For example, there is a limit in dissolving oxygen to an ultra-high-concentration supersaturation level of 150 ppm or more. In addition, this apparatus has a demerit in that dissolved oxygen is gradually degassed in a stopped state, whereby dissolved oxygen concentration is reduced over time.

DISCLOSURE

Technical Problem

The present invention has been made in view of the above problems, and it is an object of the present invention to provide a high-concentration oxygenated water generation apparatus capable of generating oxygenated water having oxygen dissolved therein at high concentration, maximally inhibiting degassing of dissolved oxygen even in the state in which a circulation operation is stopped, thereby maintaining dissolved oxygen concentration, and allowing high-concentration oxygenated water to be dispensed and drunk at any time in an indoor installation place, such as a home, an office, and a hospital, due to small size thereof and small noise therefrom.

Technical Solution

A high-concentration oxygenated water generation apparatus according to the present invention to accomplish the above object dissolves oxygen from an oxygen source in water stored in a water tank to generate high-concentration oxygenated water. The high-concentration oxygenated water generation apparatus includes a circulation pump connected to an outlet of the water tank such that fluid flow is possible, a dissolution tank connected to the circulation pump and the oxygen source such that fluid flow is possible, the dissolution tank being configured to receive the water stored in the water tank and the oxygen from the oxygen source through the circulation pump and to discharge oxygenated water having increased dissolved oxygen concentration in the water, a pressure dissolution unit connected to the dissolution tank such that fluid flow is possible, the pressure dissolution unit having a wound coil part or a plurality of bent parts, the pressure dissolution unit being configured to further increase the dissolved oxygen concentration of the oxygenated water and to discharge high-concentration oxygenated water, and a dispenser water tank connected to the pressure dissolution unit and the water tank such that fluid flow is possible, the dispenser water tank being configured to receive the high-concentration oxygenated water from the pressure dissolution unit, to store the high-concentration oxygenated water, and to provide the high-concentration oxygenated water to a user. The dissolution tank includes a plurality of dispersion trays, each of the dispersion trays having an inclined surface extending outwards and downwards, and a plurality of water collection trays, each of the water collection trays having an inclined surface extending inwards and downwards, each of the water collection trays being provided at a lower end thereof with a through-hole. The plurality of dispersion trays and the plurality of water collection trays are alternately disposed in an upward-downward direction, whereby contact area and contact time between water and oxygen may be maximized, and impact applied to a mixture of water and oxygen due to collision by gravity and degassing due thereto may be minimized.

The high-concentration oxygenated water generation apparatus may further include a mixer connected to the circulation pump, the mixer being configured to disperse the oxygen from the oxygen source in a water flow in an air bubble form to generate a mixture of water and oxygen and to supply the mixture of water and oxygen to the dissolution tank.

Each of at least some of the plurality of dispersion trays may have a conical shape.

Each of at least some of the plurality of water collection trays may have a funnel shape and may be provided at the lower end thereof with the through-hole.

An outer edge of each of the plurality of water collection trays may be in tight contact with an inner wall of the dissolution tank.

The pressure dissolution unit may include a pipe diameter decrease reducer having a first inlet and a first outlet enlarged so as to be larger than the first inlet, a pipe diameter increase reducer having a second inlet and a second outlet reduced so as to be smaller than the second inlet, and a pressure dissolution pipe disposed between the first outlet of the pipe diameter decrease reducer and the second inlet, the pressure dissolution pipe having the wound coil part or the plurality of bent parts, the pressure dissolution pipe being configured to further increase the dissolved oxygen concentration under pressure higher than pressure in the first inlet and pressure in the second outlet.

The high-concentration oxygenated water generation apparatus may further include a stabilization tube disposed between the dispenser water tank and the water tank, the stabilization tube being configured to inhibit degassing of the high-concentration oxygenated water stored in the dispenser water tank in the state in which the circulation pump is not operated using the weight of water.

The stabilization tube may include a first stabilization tube connected to the dispenser water tank, the first stabilization tube having an inlet formed at an upper end thereof and an outlet formed at a lower side thereof, and a second stabilization tube connected to the first stabilization tube, the second stabilization tube having an inlet formed at a lower side thereof and an outlet formed at an upper side thereof.

The first stabilization tube may have a shock absorption tray provided under the inlet of the first stabilization tube, the shock absorption tray being configured to prevent free downward falling of high-concentration oxygenated water introduced through the inlet of the first stabilization tube and allow the high-concentration oxygenated water to flow downwards along an inner wall of the first stabilization tube.

In a more general aspect, the present invention is not limited to oxygenated water, in which oxygen is dissolved in water, and provides a gas dissolution apparatus capable of dissolving gas in liquid at high concentration and maintaining a dissolved gas concentration even in the state in which a circulation operation is stopped. The gas dissolution apparatus according to the present invention includes a dissolution tank configured to receive liquid and gas from a circulation pump and a gas source, respectively, and to discharge a mixture of liquid and gas having increased dissolved gas concentration in the liquid, and a pressure dissolution unit connected to the dissolution tank such that fluid flow is possible, the pressure dissolution unit having a wound coil part or a plurality of bent parts, the pressure dissolution unit being configured to further increase the dissolved gas concentration and to discharge a high-concentration gas solution. The dissolution tank includes a plurality of dispersion trays, each of the dispersion trays having an inclined surface extending outwards and downwards, and a plurality of water collection trays, each of the water collection trays having an inclined surface extending inwards and downwards, each of the water collection trays being provided at a lower end thereof with a through-hole. The plurality of dispersion trays and the plurality of water collection trays are alternately disposed in an upward-downward direction.

Advantageous Effects

According to the present invention, a mixture of water and oxygen introduced into a dissolution tank falls while being widely spread along an inclined surface, the length of which maximally extends, in the dissolution tank, whereby contact area and contact time between water and oxygen are maximized. As a result, sufficient dissolution is performed until balance between dissolved oxygen in oxygenated water and oxygen gas, with which an upper part of the dissolution tank is filled, is achieved, and therefore it is possible to generate high-concentration oxygenated water having a dissolved oxygen concentration of 180 ppm or more.

In the high-concentration oxygenated water generation apparatus, collision between oxygenated water and collision between the oxygenated water and an inner structure of the apparatus are maximally inhibited, whereby degassing of oxygen is maximally inhibited and collision sound and other noises are minimized. For example, the shape and disposition of members in the dissolution tank are set to minimize impact applied to oxygenated water gathered in a lower part of the dissolution tank due to falling of the mixture of water and oxygen. In the same aspect, the shape and disposition of members in a first stabilization pipe are set. As a result, it is possible to maximally prevent degassing of oxygen from high-concentration oxygenated water, which is sensitive to impact, due to impact in the apparatus.

In addition, since a condition approximating normal pressure is imparted to a dispenser water tank without application of separate artificial pressure to the dispenser water tank in the state in which operation is stopped but movement of a fluid in the dispenser water tank is limited due to the water curtain type fluid blocking operation of water stored in first and second stabilization pipes, degassing of dissolved oxygen from oxygenated water stored in the dispenser water tank is maximally inhibited. When a user wishes to dispense high-concentration oxygenated water, therefore, it is possible to immediately dispense and drink the high-concentration oxygenated water even though the dissolution tank is not driven again and operated.

The high-concentration oxygenated water generation apparatus may be installed in any indoor space at a place, such as a home, an office, and a hospital. In particular, the high-concentration oxygenated water generation apparatus according to the present invention may be installed at a hospital or other related treatment facilities in the state in which a medical oxygen tank is applied as an oxygen source. At the point in time when the present application is filed, it is possible to provide high-concentration oxygenated water to pandemic COVID-19 patients. As a result, the high-concentration oxygenated water generation is capable of helping in maintaining lives of COVID-19 patients, maintaining the functions of bodily organs, including the brain, and remedying diseases irrespective of severity of the patients. Of course, it is also useful to patients who suffer from respiratory diseases and other diseases.

BEST MODE

In order to more clearly disclose features and advantages of the technical solution means of the present invention, the present invention will be described in more detail with reference to specific embodiments shown in the accompanying drawings.

In the accompanying drawings, the same elements are indicated using the same reference numerals if possible. In the drawings, some elements are exaggerated, omitted, or schematically illustrated, and the size of each element does not entirely reflect the actual size thereof.

In the following description, only parts necessary to understand embodiments of the present invention will be described, and a detailed description of related known functions and configurations will be omitted for sake of convenience when the same may obscure the subject matter of the present invention.

In addition, when one element is said to be "connected" or "coupled" to another element, this means that the elements may be logically, physically, or fluidly connected or coupled to each other. In other words, it should be understood that one element may be directly connected to another element, a further element may be present therebetween, or elements may be indirectly connected or coupled to each other through a further element or via a further element.

The terms used in this specification are selected only to describe a specific embodiment, not to define the present invention. Singular forms include plural forms unless mentioned otherwise. Also, it should be understood that the terms "comprises," "has," etc. used in this specification specify the presence of stated features, numbers, steps, operations, elements, components, or combinations thereof, but do not preclude the presence or addition of one or more other features, numbers, steps, operations, elements, components, or combinations thereof.

In the following description, the terms "front," "rear," "upper," "lower," "left," "right," etc. are expressed based on the drawings, and the shape and position of each element is not limited by these terms. Meanwhile, the term "connection tube" indicates a conduit that allows a fluid to flow between members, and is not limited to a specific shape or material. On the other hand, it should be understood that the terms "~tank" and "~pipe" are names arbitrarily assigned in consideration of relative sizes, but there is no intrinsic difference in shape or function therebetween, and therefore the above terms are changeable.

Figure 1:
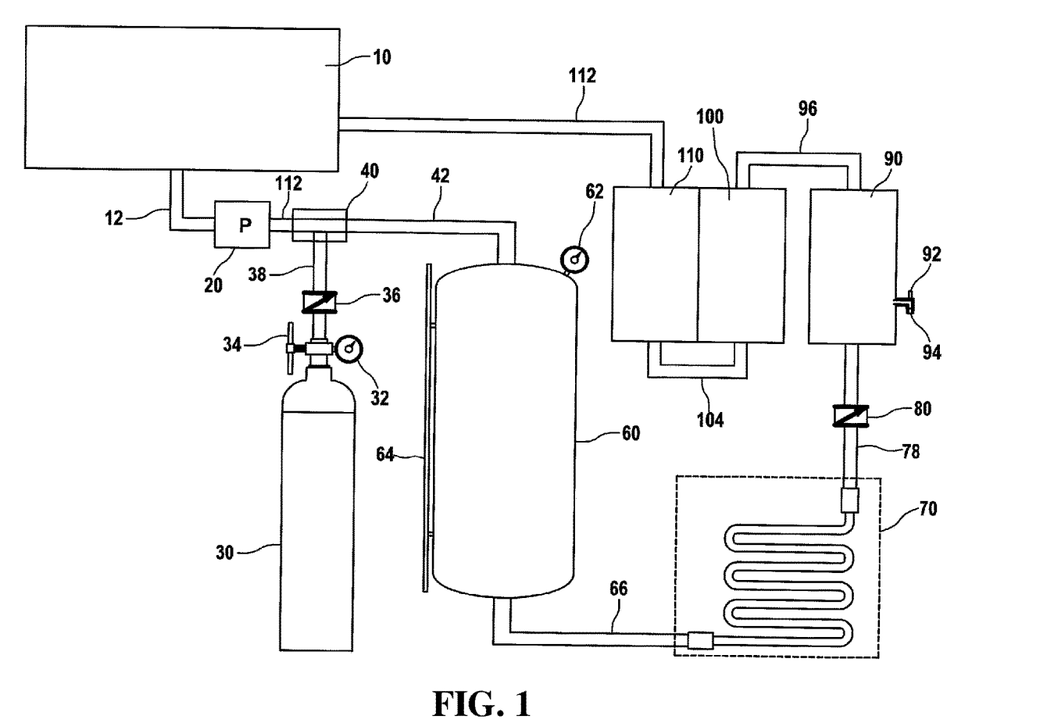
FIG. 1 is a view schematically showing the construction of a high-concentration oxygenated water generation apparatus according to an embodiment of the present invention.

Referring to FIG. 1, a high-concentration oxygenated water generation apparatus according to an embodiment of the present invention, which is an apparatus that repeats a circulation process of dissolving oxygen in water stored in a water tank 10 and returning the water having the oxygen dissolved therein to the water tank 10 several times, thereby achieving supersaturation of oxygen in water, includes a circulation pump 20, an oxygen source 30, a mixer 40, a cooling chiller 50, a dissolution tank 60, a pressure dissolution unit 70, a dispenser water tank 90, a first stabilization pipe 100, and a second stabilization pipe 110. In addition, the high-concentration oxygenated water generation apparatus further includes a printed circuit board (not shown) having a control circuit configured to control overall operation thereof mounted thereon.

The circulation pump 20 has an inlet connected to a discharge port provided at a lower end of the water tank 10 via a first connection tube 12 and an outlet connected to the mixer 40 via a second connection tube 22. The circulation pump suctions water stored in the water tank 10 and discharges the suctioned water through the mixer 40 side outlet such that the water in the water tank is circulated via the mixer 40, the cooling chiller 50, the dissolution tank 60, the pressure dissolution unit 70, the dispenser water tank 90, the first stabilization pipe 100, and the second stabilization pipe 110.

The oxygen source 30 supplies oxygen gas to the mixer 40 via a third connection tube 38. A medical oxygen tank filled with medical oxygen gas may be used as the oxygen source 30. An oxygen gauge configured to indicate oxygen flow rate or residual oxygen amount and a knob 34 configured to completely block the supply of oxygen as needed are installed at an upper end of the oxygen tank 30. In addition, a solenoid valve 36 configured to regulate the supply of oxygen to the mixer 40 side according to a command from the printed circuit board is installed at a connection part between the oxygen tank 30 and the third connection tube 38. Furthermore, in order to prevent reverse flow of oxygen or water from the mixer 40 to the oxygen tank 30 side through the third connection tube 38, a check valve (not shown) may be installed at one point of the third connection tube 38. Meanwhile, in another embodiment of the present invention, a pressure swing adsorption type, membrane type, or electrolysis type oxygen generator or any one of other different type oxygen generators may be used as the oxygen source 30. The oxygen source 30 may be a separate device provided outside the high-concentration oxygenated water generation apparatus so as to be connected to the third connection tube 38, not a component mounted in a housing of the high-concentration oxygenated water generation apparatus.

The mixer 40 has a first inlet connected to the outlet of the circulation pump 20 via the second connection tube 22, a second inlet connected to the oxygen source 30 via the third connection tube 38, and an outlet connected to the cooling chiller 50 via a fourth connection tube 22. The mixer disperses oxygen supplied from the oxygen source 30 in water passing through the first and second connection tubes 12 and 22 in the form of air bubbles. In an embodiment, the mixer 40 is implemented by a tee fitting. In another embodiment, however, the mixer 40 may be implemented by a venturi type injector.

In order to increase solubility in a process of dissolving oxygen in water in the dissolution tank 60, the cooling chiller 50 cools a mixture of water and oxygen supplied from the mixer 40 via the fourth connection tub 42 and additionally maintains the temperature of the mixture of water and oxygen as uniform as possible. The cooling chiller 50 supplies the cooled mixture of water and oxygen to the dissolution tank 60 via a fifth connection tube 52.

The dissolution tank 60 receives the mixture of water and oxygen through the fifth connection tube 52, and dissolves oxygen gas in the water so as to be supersaturated. The dissolution tank 60 is appropriately cylindrical and is installed so as to be disposed upright. The dissolution tank 60 is provided in the center of an upper surface thereof with an inlet, to which one end of the fifth connection tube 52 is coupled, and is provided in a lower surface thereof with an outlet, to which one end of a sixth connection tube 66 for connection with the pressure dissolution unit 70 is coupled. A pressure sensor 62 configured to detect and indicate the pressure in the dissolution tank 60 is installed outside the upper surface of the dissolution tank 60 or at one side surface of the dissolution tank. In addition, a water level sensor 64 configured to detect water level in the dissolution tank 60 is installed at the other side surface of the dissolution tank 60.

Figure 2:
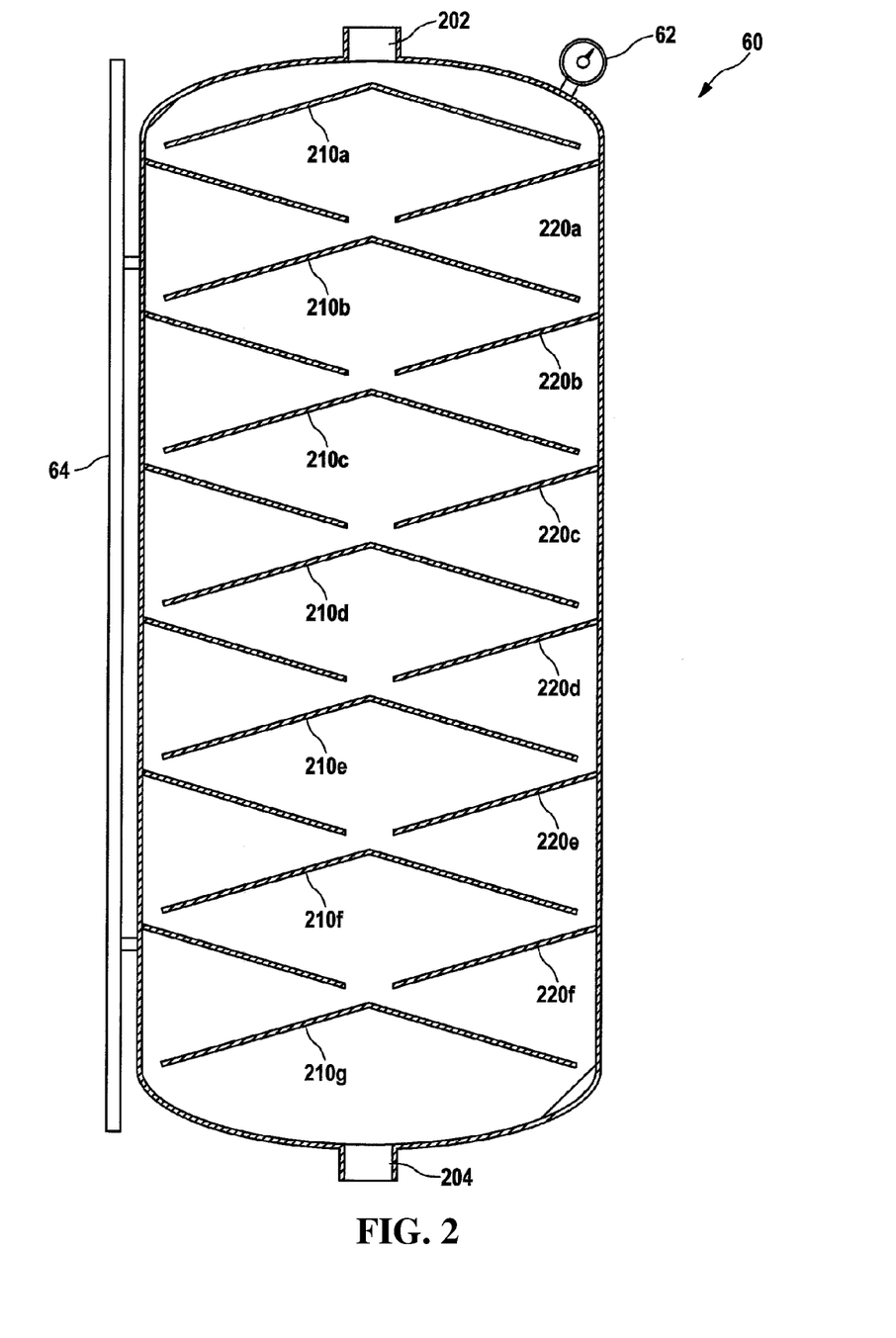
FIG. 2 is a sectional view of a dissolution tank shown in FIG. 1.

FIG. 2 shows the construction of the dissolution tank 60 in detail. Referring to FIG. 2, a plurality of dispersion trays 210a to 210g and a plurality of water collection trays 220a to 220f are alternately disposed in a vertical direction between an inlet 202 located at an upper end of the dissolution tank 60 and an outlet 204 located at a lower end of the dissolution tank. That is, a first dispersion tray 210a is disposed under the inlet 202 of the dissolution tank 60, a first water collection tray 220a is disposed under the first dispersion tray 210a, a second dispersion tray 210b is disposed under the first water collection tray 220a, a second water collection tray 220b is disposed under the second dispersion tray 210b, a third dispersion tray 210c is disposed under the second water collection tray 220b, a third water collection tray 220c is disposed under the third dispersion tray 210c, a fourth dispersion tray 210d is disposed under the third water collection tray 220c, a fourth water collection tray 220d is disposed under the fourth dispersion tray 210d, a fifth dispersion tray 210e is disposed under the fourth water collection tray 220d, a fifth water collection tray 220e is disposed under the fifth dispersion tray 210e, a sixth dispersion tray 210f is disposed under the fifth water collection tray 220e, a sixth water collection tray 220f is disposed under the sixth dispersion tray 210f, and a seventh dispersion tray 210g is disposed under the sixth water collection tray 220f.

The first to seventh dispersion trays 210a to 210g may have the same shape. In addition, the first to sixth water collection trays 220a to 220f may have the same shape. Although seven dispersion trays 210a to 210g and six water collection trays 220a to 220f are shown in FIG. 2, the numbers of the trays are not limited thereto, and the numbers of the trays may be changed by design depending on the size or specifications of the high-concentration oxygenated water generation apparatus. Meanwhile, although the lowermost tray immediately above the outlet 204 of the dissolution tank 60 is shown as the dispersion tray 210g in FIG. 2, the last tray may be a water collection tray. On the other hand, the uppermost tray may be a water collection tray, not the dispersion tray 210a.

Figure 3A:
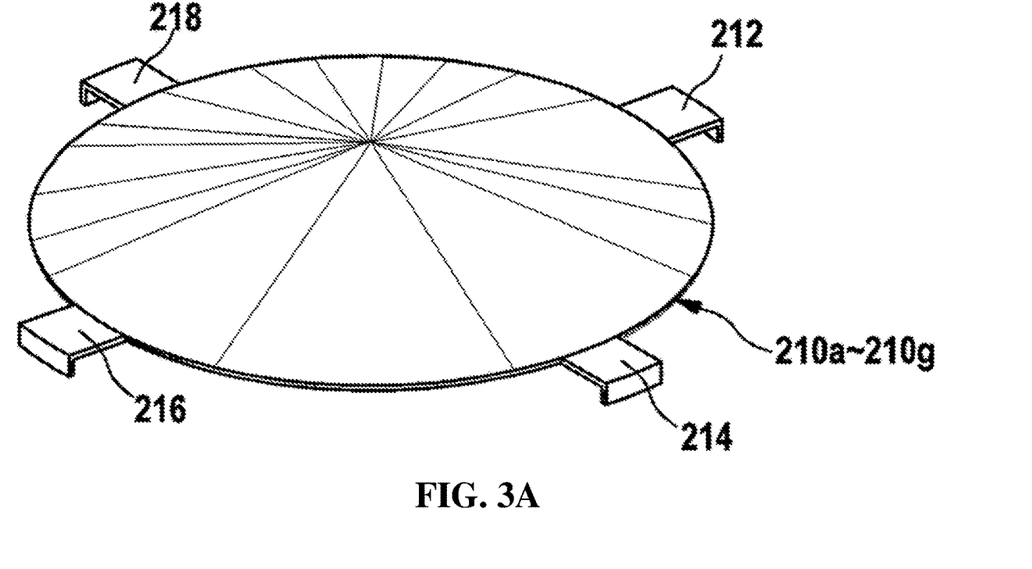
FIGS. 3A-3B are perspective views of a dispersion tray and a water collection tray shown in FIG. 2.
Figure 3B:
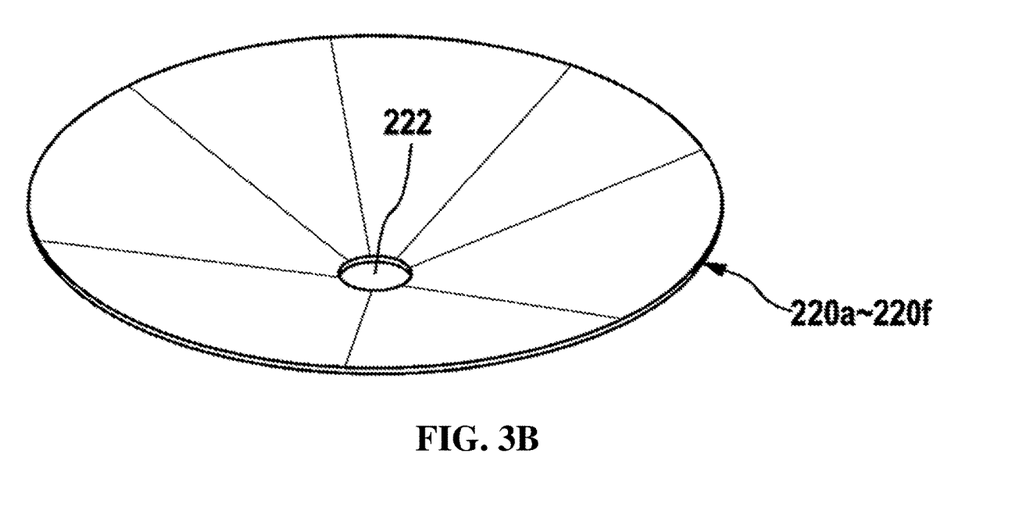

As shown in FIGS. 3A-3B, each of the dispersion trays 210a to 210g is formed in a conical shape having a gently inclined surface. The diameter of an outer edge of each of the dispersion trays 210a to 210g is manufactured so as to be slightly less than the inner diameter of the dissolution tank 60. As a result, a gap is formed between the outer edge of each of the dispersion trays 210a to 210g and an inner wall of the dissolution tank 60. Consequently, the water or the mixture of water and oxygen introduced into each of the dispersion trays 210a to 210g flows downwards along the upper inclined surface thereof toward the outer edge thereof, and moves downwards through the gap between the outer edge of each of the dispersion trays 210a to 210g and the inner wall of the dissolution tank 60. In a process of manufacturing the dissolution tank, the dispersion trays 210a to 210g may be fixed to the inner wall of the dissolution tank 60 via support members 212 to 218 by welding or using an adhesive at a plurality of points.

Meanwhile, each of the water collection trays 220a to 220f is formed in a funnel shape having a gently inclined surface, i.e. an inverted conical shape. Each of the water collection trays 220a to 220f is provided at a lower-end vertex thereof with a through-hole 222, which is formed by cutting. The diameter of an outer edge of each of the water collection trays 220a to 220f is equal to the inner diameter of the dissolution tank 60 within a range within which the water collection trays 220a to 220f can be inserted into and installed in the dissolution tank 60. The outer edge of each of the water collection trays 220a to 220f is fixed to the inner wall of the dissolution tank 60 by welding or using an adhesive. In the state in which assembly is completed, the mixture of water and oxygen introduced into each of the water collection trays 220a to 220f flows downwards along the upper inclined surface of each of the water collection trays 220a to 220f toward the through-hole 222, is collected in the through-hole 222, and is discharged downwards through the through-hole 222.

In order to minimize impact applied to the mixture of water and oxygen introduced through the inlet 202 when the mixture of water and oxygen collides with the first dispersion tray 210a, it is preferable for the distance between the inlet 202 of the dissolution tank 60 and the first dispersion tray 210a, which is the uppermost tray, to be set to be as small as possible. Also, in order to minimize impact applied to the mixture of water and oxygen that falls downwards from the outer edge of each of the dispersion trays 210a to 210g, it is preferable for the distance between the outer edge of each of the dispersion trays 210a to 210f and the outer edge of a corresponding one of the water collection trays 220a to 220f immediately thereunder to be minimized. In the same manner, in order to minimize impact applied to the mixture of water and oxygen that falls downwards from the through-hole 222 of each of the collection trays 220a to 220f, it is also preferable for the distance between a lower end of each of the water collection trays 220a to 220f and an upper end of a corresponding one of the dispersion trays 210b to 210g to be minimized.

In the dissolution tank 60, the mixture of water and oxygen introduced through the inlet 202 falls to a vertex of the first dispersion tray 210a, flows downwards along the upper inclined surface of the first dispersion tray 210a toward the outer edge thereof, and falls to the outer edge of the first water collection tray 220a through the gap between the outer edge of the first dispersion tray 210a and the inner wall of the dissolution tank 60 or along the inner wall of the dissolution tank 60. The mixture of water and oxygen that has fallen to the first water collection tray 220a flows downwards along the upper inclined surface of the first water collection tray 220a toward the through-hole 222, is collected in the through-hole 222, and falls to a vertex of the second dispersion tray 210b through the through-hole 222. This operation is performed on all of the dispersion trays and the collection trays until the mixture of water and oxygen reaches the outlet 204 of the dissolution tank 60.

Under internal environments of the dissolution tank 60 in which an upper space of the dissolution tank is filled with oxygen gas and pressure generated by the pump is applied to the dissolution tank, water mixed with oxygen bubbles falls while being widely spread along the inclined surface, the length of which maximally extends, as described above, whereby contact area and contact time between water and oxygen (i.e. oxygen, with which the upper part of the dissolution tank is filled, and oxygen bubbles mixed in water) are maximized. As a result, sufficient dissolution is performed until balance between partial pressure of oxygen dissolved in water, i.e. dissolved oxygen, and oxygen gas, with which the upper part of the dissolution tank is filled, is achieved, and therefore it is possible to generate high-concentration oxygenated water in which oxygen is dissolved in water so as to be supersaturated. The dissolution tank 60 discharges a mixture of oxygenated water and oxygen in which oxygen bubbles are mixed in oxygenated water to the pressure dissolution unit 70 via a sixth connection tube 66.

Referring back to FIG. 1, the pressure dissolution unit 70 includes a pipe diameter decrease reducer 72, a pressure dissolution pipe 74, and a pipe diameter increase reducer 76.

Figure 4:
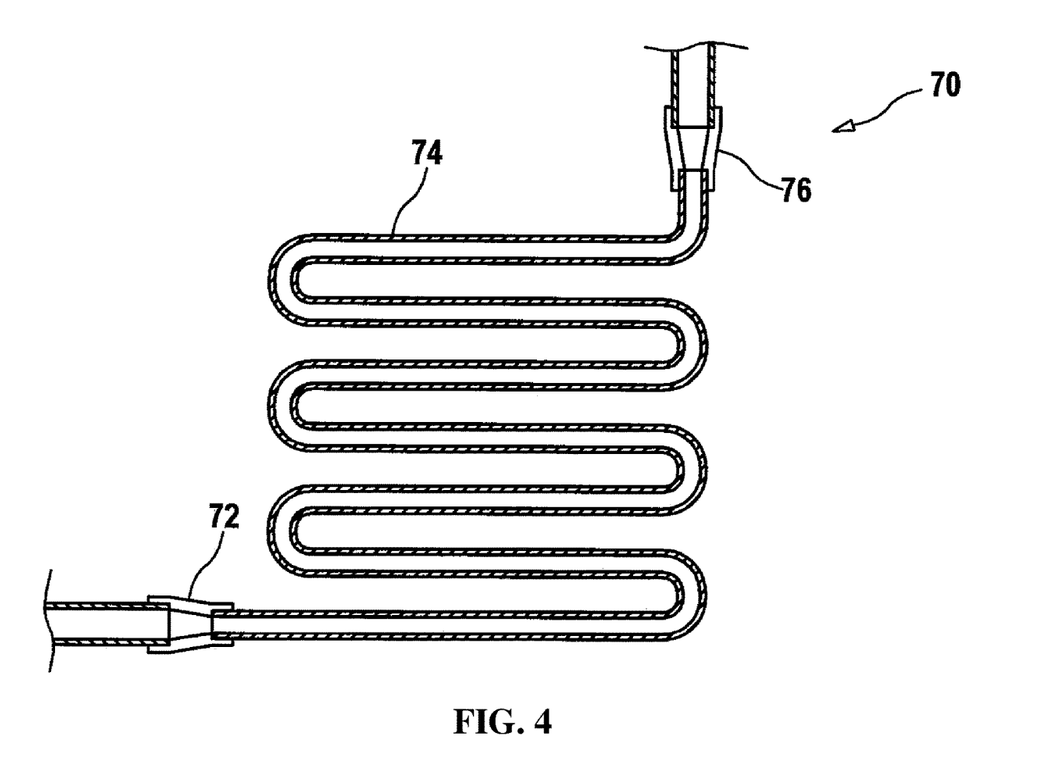
FIG. 4 is a view showing in detail the construction of a pressure dissolution unit shown in FIG. 1.

As shown in FIG. 4, the pressure dissolution pipe 74, which is a hollow member having a large length, is wound in a coil shape or bent several times, and is made of a synthetic resin, such as nylon, or a metal material. The pressure dissolution pipe 74 generates turbulence in the mixture of oxygenated water and oxygen received from the dissolution tank 60 via the sixth connection tube 66 while allowing the mixture of oxygenated water and oxygen to pass therethrough such that the residual oxygen bubbles in the mixture of oxygenated water and oxygen are completely dissolved in water, thereby increasing dissolved oxygen concentration and stabilizing a dissolved state.

The pressure dissolution pipe 74 of the pressure dissolution unit 70 has a pipe diameter less than the pipe diameter of the sixth connection tube 66 connected to the dissolution tank 60 or a seventh connection tube 78 connected to the dispenser water tank 80. The pipe diameter decrease reducer 72 is a pipe connection member configured to allow the sixth connection tube 66 and the pressure dissolution pipe 74 to be connected to each other therethrough while resolving the difference in pipe diameter therebetween. Meanwhile, the pipe diameter increase reducer 76 is a pipe connection member configured to allow the pressure dissolution pipe 74 and the seventh connection tube 78 and to be connected to each other therethrough while resolving the difference in pipe diameter therebetween. The pipe diameter increase reducer may be a member that is identical to the pipe diameter decrease reducer 72 and is disposed in the reverse direction. The pressure in the pressure dissolution pipe 74 becomes higher than the pressure in each of the sixth and seventh connection tubes 66 and 78 due to the difference in pipe diameter between the pressure dissolution pipe 74 and each of the sixth and seventh connection tubes 66 and 78. The increased pressure in the pressure dissolution pipe 74 accelerates secondary dissolution of the residual oxygen bubbles and stabilization of oxygenated water. The difference in internal pressure generated by the pipe diameter decrease reducer 72 and the pipe diameter increase reducer 76 makes a pressure adjustment valve unnecessary, whereby there are advantages in that it is possible to prevent spin and impact that may occur in the valve when the valve is used and to prevent degassing of oxygen due thereto.

Referring back to FIG. 1, a solenoid valve 80 is installed on the seventh connection tube 78, which connects the pressure dissolution unit 70 and the dispenser water tank 90 to each other. During operation of the circulation pump 20, the solenoid valve 80 is open to allow a fluid to move through the seventh connection tube 78. When the circulation pump 20 is not operated, the solenoid valve is closed to block the movement of the fluid. In the state in which fluid circulation is stopped in the apparatus, therefore, due to the pressure in the dissolution tank 60 and the pressure dissolution pipe 74, the solenoid valve 80 prevents the fluid in the dissolution tank 60 and the pressure dissolution pipe 74 from unintentionally slowly moving to the dispenser water tank 90 due to the difference in pressure from high-concentration oxygenated water stored in the dispenser water tank 90.

The dispenser water tank 90 receives high-concentration oxygenated water that has secondarily dissolved in the pressure dissolution unit 70 via the seventh connection tube 78 and stores the received high-concentration oxygenated water. The dispenser water tank continues to store the high-concentration oxygenated water or returns the high-concentration oxygenated water to the water tank 10 depending on whether the circulation pump 20 is operated. That is, the dispenser water tank 90 continues to store the high-concentration oxygenated water received from the pressure dissolution unit 70 when the circulation pump 20 is not operated, and the high-concentration oxygenated water stored in the dispenser water tank 90 returns to the water tank via the first and second stabilization pipes 100 and 110 and is then circulated during operation of the circulation pump 20. Meanwhile, a refrigerant coil is disposed at an outer circumferential surface of the dispenser water tank 90 so as to enclose the outer circumferential surface of the dispenser water tank, whereby it is possible to maintain the temperature of the high-concentration oxygenated water at 5 to 6° C. In addition, a dispenser 94 having a stopcock 92 attached thereto is installed at the outer circumferential surface of the dispenser water tank 90 so as to be exposed to the outside. Irrespective of whether the circulation pump 20 is operated, therefore, a user may manipulate the stopcock 92 to dispense the high-concentration oxygenated water through the dispenser 94 so as to be drunk.

The first and second stabilization tanks 100 and 110 are disposed between the dispenser water tank 90 and the water tank 10. During operation of the circulation pump 20, the first and second stabilization tanks 100 and 110 provide a path configured to allow the high-concentration oxygenated water stored in the dispenser water tank 90 to return to the water tank 10 therethrough so as to be circulated. When the circulation pump 20 is not operated, the first and second stabilization tanks prevent oxygen gas from being degassed from the high-concentration oxygenated water stored in the dispenser water tank 90 and moving in a direction toward the water tank 10. As a result, it is possible to maximally inhibit degassing of oxygen gas from the high-concentration oxygenated water stored in the dispenser water tank 90.

Figure 5:
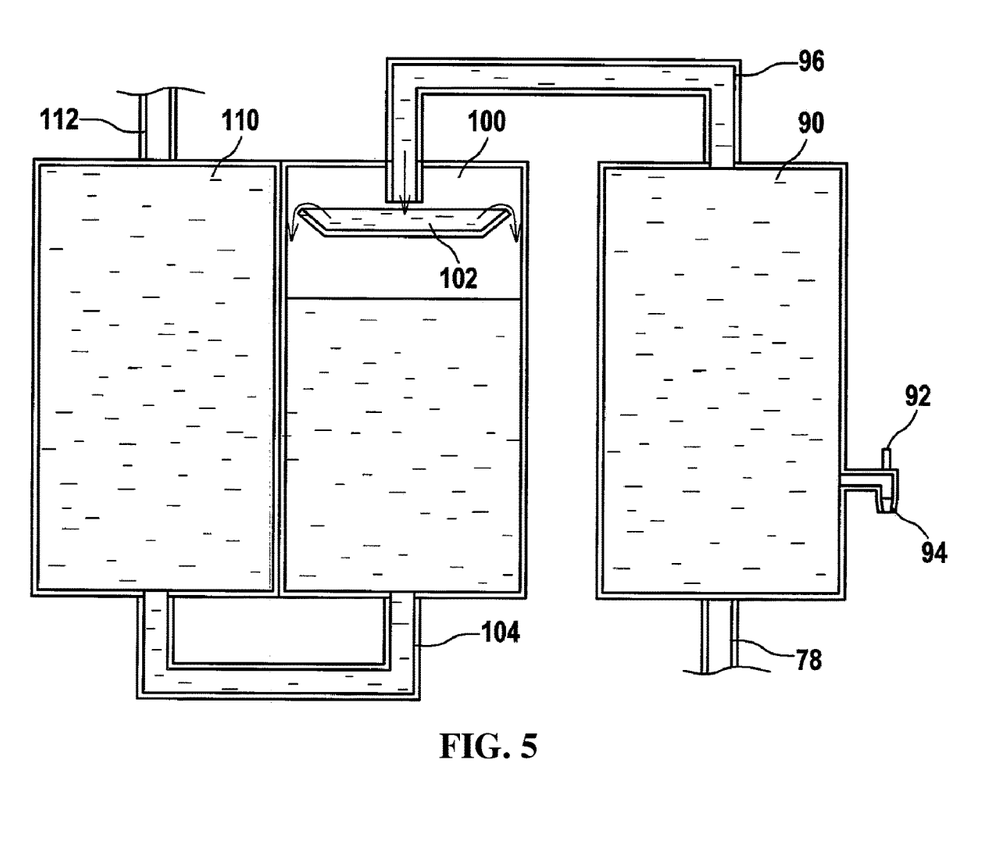
FIG. 5 is a view showing in detail the construction of a dispenser water tank, a first stabilization pipe, and a second stabilization pipe shown in FIG. 1.

Here, the first stabilization tank 100 is connected to the dispenser water tank 90 via an eighth connection tube 96. As shown in FIG. 5, an inlet of the first stabilization tank 100 may be provided at an upper side of the first stabilization tank 100, and it is preferable for an outlet of the first stabilization tank to be provided at a bottom or a lower end of a side surface of the first stabilization tank 100. An insignificant amount of oxygen gas degassed from the high-concentration oxygenated water stored in the dispenser water tank 90 moves to the first stabilization tank 100 via the eighth connection tube 96. As a result, the lower part of the first stabilization tank 100 is filled with the liquid, i.e. the high-concentration oxygenated water, and the upper part of the first stabilization tank is filled with the oxygen gas.

A shock absorption tray 102 is installed in the first stabilization tank 100 at the upper part thereof. The shock absorption tray 102 may have a cup or dish shape, or may have a shape identical to the shape of each of the dispersion trays 210a to 210g or the water collection trays 220a to 220f of the dissolution tank 60 shown in FIGS. 3A-3B. Irrespective of the shape thereof, the diameter of an outer edge of the shock absorption tray 102 is manufactured so as to be slightly less than the inner diameter of the first stabilization tank 100. As a result, a gap is formed between the outer edge of the shock absorption tray 102 and an inner wall of the first stabilization tank 100. During a circulation process performed to increase dissolved oxygen concentration of oxygenated water, therefore, when the high-concentration oxygenated water introduced into the shock absorption tray 102 overflows from the outer edge of the shock absorption tray 102, the high-concentration oxygenated water does not directly freely fall in a space including gas, with which the upper part of the first stabilization tank 100 is filled but flows downwards along the inner wall of the first stabilization tank 100. Consequently, impact applied to the oxygenated water moving downwards from the shock absorption tray 102 when colliding with oxygenated water gathered in the lower part of the first stabilization tank is minimized, whereby it is possible to inhibit noise and degassing due to collision.

Meanwhile, the second stabilization tank 110 is connected to the first stabilization tank 100 via a ninth connection tube 104, and is connected to the water tank 10 via a tenth connection tube 112. The second stabilization tank 110 applies water pressure corresponding to the height thereof to the first stabilization tank 100, thereby inhibiting degassing of oxygen from the oxygenated water in the first stabilization tank 100 and preventing movement of the oxygen gas gathered at the upper side of the first stabilization tank 100 toward the water tank 10. As the result of operation of the first and second stabilization tanks 100 and 110, as described above, it is possible to maximally inhibit reduction of dissolved oxygen concentration due to degassing of oxygen from the high-concentration oxygenated water stored in the dispenser water tank 90.

The high-concentration oxygenated water generation apparatus shown in FIG. 1 is operated as follows:

Water stored in the water tank 10 is supplied to the inlet of the circulation pump 20 via the first connection tube 12, is pressurized, and is supplied to the mixer 40 via the second connection tube 22. A mixture of water and oxygen mixed by the mixer 40 is introduced into the inlet 202 of the dissolution tank 60, which is located at the upper end of the dissolution tank, via the cooling chiller 50.

The mixture of water and oxygen falling downwards from the inlet 202 of the dissolution tank 60 due to gravity collides with the vertex of the first dispersion tray 210a while being dispersed. At this time, collision impact is not great, since the distance between the inlet 202 and the first dispersion tray 210a is small and the upper surface of the first dispersion tray 210a is inclined.

Figure 6:
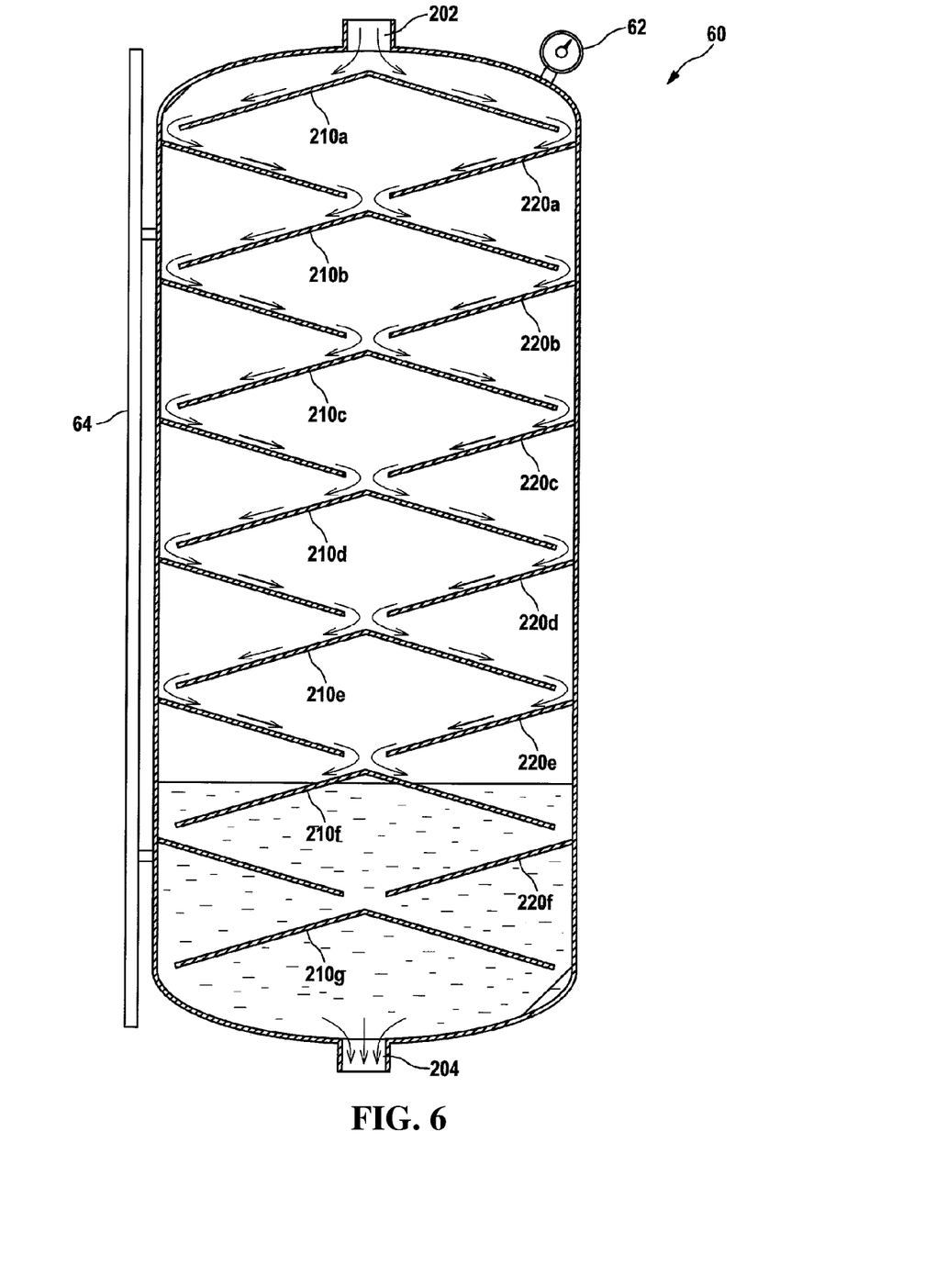
FIG. 6 is a view showing the flow of water in the dissolution tank during operation of the apparatus.

Most oxygen gas simply mixed with water in a state of not being dissolved in the mixture of water and oxygen is separated from the mixture of water and oxygen in the dissolution tank 60, and the upper space of the dissolution tank 60 is filled with the oxygen gas. In this state, as shown in FIG. 6, the mixture of water and oxygen that has collided with the first dispersion tray 210a flows downwards along the upper inclined surface of the first dispersion tray 210a toward the outer edge thereof while widely spreading to a small thickness. At this time, since the mixture of water and oxygen radially flows downwards along the upper inclined surface of the first dispersion tray 210a while widely spreading to a small thickness, contact area between the mixture of water and oxygen and the oxygen gas gathered in the upper part of the dissolution tank 60 is remarkably increased, compared to the case in which the mixture of water and oxygen falls vertically downwards from the inlet 202 of the dissolution tank 60, and contact time is also greatly increased in proportion to an increase in dwell time. Since contact area and contact time between water and oxygen gas are greatly increased in a pressurized state, as described above, whereby a large amount of oxygen may be dissolved in water.

The mixture of water and oxygen that has radially flowed downwards along the upper inclined surface of the first dispersion tray 210a falls to the outer edge of the first water collection tray 220a through the gap between the outer edge of the first dispersion tray 210a and the inner wall of the dissolution tank 60 or along the inner wall of the dissolution tank 60. Even at this time, collision impact is small enough to be ignored and degassing due to collision impact is insignificant, since the distance between the outer edge of the first dispersion tray 210a and the outer edge of the first water collection tray 220a is small.

The mixture of water and oxygen that has fallen to the first water collection tray 220a flows downwards along the upper inclined surface of the first water collection tray 220a toward the through-hole 222 while widely spreading to a small thickness. Even at this time, since the mixture of water and oxygen flows downwards along the upper inclined surface of the first water collection tray 220a while widely spreading to a small thickness, contact area between the mixture of water and oxygen and the oxygen gas gathered in the upper part of the dissolution tank 60 is remarkably increased, compared to the case in which the mixture of water and oxygen falls vertically downwards without restriction, and contact time is also greatly increased in proportion to an increase in dwell time. An increase in contact area and contact time between water and oxygen gas in a pressurized state greatly contributes to an increase in amount of dissolved oxygen. The mixture of water and oxygen collected in the through-hole 222 falls to the vertex of the second dispersion tray 210b through the through-hole 222. Even at this time, collision impact is small enough to be ignored and degassing due to collision impact is insignificant, since the distance between the through-hole 222 of the first water collection tray 220a and the upper end of the second dispersion tray 210b is small.

The downward flow of the water or the mixture of water and oxygen along the inclined surface while widely spreading to a small thickness is performed for each of the dispersion trays 210a to 210g and the water collection trays 220a to 220f. Consequently, the amount of dissolved oxygen in the dissolution tank 60 is increased to several ten to several hundred times the amount of dissolved oxygen in the case in which water and oxygen are simply brought into contact with each other or the case in which the mixture of water and oxygen simply falls like a waterfall. As a result, primary oxygen dissolution with sufficiently high concentration is achieved in the dissolution tank 60. In addition, since the distance between each of the dispersion trays 210a to 210g and a corresponding one of the water collection trays 220a to 220f disposed vertically up and down is small, collision impact applied to the oxygenated water during falling of the oxygenated water or the mixture of water and oxygen may be minimized, and degassing occurring while forming microbubbles due to impact may be minimized.

Dissolved oxygen concentration after primary dissolution in the dissolution tank 60 is changed depending on the number of circulations or circulation frequency of oxygenated water that passes through the water tank 10, the pressure in the dissolution tank 60, and the water level in the dissolution tank 60. That is, dissolved oxygen concentration increases as the number of circulations or circulation frequency of oxygenated water increases and the pressure in the dissolution tank 60 increases. In addition, since contact area and contact time between water and oxygen on each of the dispersion trays 210a to 210g and the water collection trays 220a to 220f decreases as the water level in the dissolution tank 60 is higher, dissolved oxygen concentration may be reduced. The control circuit mounted on the printed circuit board controls the circulation pump 20 and the solenoid valve 36 to regulate circulation operation and the supply of oxygen based on the pressure in the dissolution tank 60 detected by the pressure sensor 62 and the water level in the dissolution tank 60 detected by the water level sensor 64.

The mixture of oxygenated water and oxygen discharged from the dissolution tank 60 is supplied to the pressure dissolution pipe 74, in which the residual oxygen microbubbles may be completely dissolved in water. The pressure dissolution pipe 74 provides an internal environment having increased pressure due to the decreased pipe diameter thereof, and forms turbulence in the mixture of oxygenated water and oxygen flowing therein due to a geometrical structure including a plurality of bent portions or curved portions. Due to the pressure and the turbulence, most of the residual oxygen bubbles included in the mixture of water and oxygen supplied from the dissolution tank 60 are forcibly dissolved in water in the pressure dissolution pipe 74, whereby a dissolved state is stabilized.

High-concentration oxygenated water stabilized as the result of secondary dissolution in the pressure dissolution pipe 74 is supplied to the dispenser water tank 90 so as to be stored therein. In the state in which the high-concentration oxygenated water is continuously cooled by the refrigerant coil enclosing the outer circumferential surface of the dispenser water tank 90, the user may manipulate the stopcock 92 to dispense the high-concentration oxygenated water through the dispenser 94 so as to be drunk.

The first and second stabilization tanks 100 and 110 are disposed between the dispenser water tank 90 and the water tank 10. During operation of the circulation pump 20, the first and second stabilization tanks provide a path configured to allow the high-concentration oxygenated water stored in the dispenser water tank 90 to return to the water tank 10 therethrough so as to be circulated. When the circulation pump 20 is not operated, the first and second stabilization tanks serve as a water curtain that inhibits oxygen gas from being degassed from the high-concentration oxygenated water stored in the dispenser water tank 90 and moving in a direction toward the water tank 10.

Oxygen gas may be insignificantly degassed from the high-concentration oxygenated water stored in the dispenser water tank 90. The degassed oxygen gas moves to the first stabilization tank 100 via the eighth connection tube 96. As a result, the lower part of the first stabilization tank 100 is filled with the liquid, i.e. the high-concentration oxygenated water, whereas the upper part of the first stabilization tank is filled with the oxygen gas. However, the oxygen gas, with which the upper space of the first stabilization tank 100 is filled, cannot push the water gathered in the lower part of the first stabilization tank 100 and cannot enter the second stabilization tank 110 due to the pressure of the water (i.e. the oxygenated water), with which the second stabilization tank 110 is filled. In the state in which external force, i.e. pump pressure, is not applied, therefore, movement of the oxygen gas, with which the upper space of the first stabilization tank 100 is filled, is prevented, and degassing from the dispenser water tank 90 and the first stabilization tank 100 is greatly inhibited due to the pressure in the first stabilization tank 100.

The high-concentration oxygenated water generation apparatus according to the present invention does not transiently allow water and oxygen to pass therethrough in order to dissolve the oxygen in the water but periodically or non-periodically performs repetitive circulation in order to increase dissolved oxygen concentration. For example, during the initial operation, the control circuit opens the solenoid valves 36 and 80 and operates the circulation pump 20 such that water in the water tank 10 is circulated, whereby oxygen is dissolved in the water. At this time, the apparatus may be operated such that water in the water tank 10 is circulated about three times on average. It was confirmed that, after first circulation, oxygenated water dispensed from the dispenser water tank 90 exhibited a dissolved oxygen concentration of about 100 ppm. It was also confirmed that, after second circulation and third circulation, the oxygenated water exhibited a dissolved oxygen concentration of about 150 ppm and about 180 ppm, respectively.

Subsequently, during continuous operation of the apparatus, the control circuit periodically or non-periodically (e.g. immediately after dispensing of high-concentration oxygenated water) opens the solenoid valves 36 and 80 and reoperates the circulation pump 20 such that oxygenated water circulation and dissolution operations are performed.

In the high-concentration oxygenated water generation apparatus according to the present invention, degassing of oxygen from oxygenated water is maximally inhibited even in a standby state in which the circulation pump 20 is stopped. Degassing may be inhibited in two aspects.

First, the fluid blocking operation of the stopped circulation pump 20 and the operation of the solenoid valve 80 not only inhibit degassing of dissolved oxygen from the oxygenated water remaining in the cooling chiller 50, the dissolution tank 60, and the pressure dissolution unit 70 but also prevent slow leakage of the oxygenated water or the mixture of water and oxygen from the components. Meanwhile, since collision between oxygenated water and apparatus members or between oxygenated water and oxygenated water in the dissolution tank 60 is greatly inhibited, degassing due to collision is remarkably reduced.

Second, degassing of dissolved oxygen from the high-concentration oxygenated water stored in the dispenser water tank 90 is inhibited due to the operation of the solenoid valve 80 and the operation of the first and second stabilization tanks 100 and 110. That is, in the state in which the first stabilization tank 100 is partially filled with water (i.e. oxygenated water) and the second stabilization tank 110 is completely filled with water, water pressure applied by the water in the second stabilization tank 110 not only prevents movement of the fluid in the dispenser water tank 90 and the first stabilization tank 100 in a direction toward the water tank 10 but also inhibits degassing from the dispenser water tank 90 and the first stabilization tank 100. In addition, since collision between oxygenated water and apparatus members or between oxygenated water and oxygenated water in the dispenser water tank 90 or the first stabilization tank 100 is inhibited, degassing due to collision is insignificant. Particularly, according to the present invention, falling of the oxygenated water causing collision between the oxygenated water and the apparatus members is fundamentally prevented, as in the shock absorption tray 102 of the first stabilization tank 100, whereby degassing due to collision is minimized.

The present invention has a merit in that, since degassing is inhibited, as described above, it is possible to maintain dissolved oxygen concentration of high-concentration oxygenated water and to reduce the frequency of circulation by the circulation pump 20. In addition, the present invention has an additional advantage in that it is possible to reduce noise due to generation of air bubbles and rise of the air bubbles to the surface through inhibition of degassing.

Although the preferred embodiment of the present invention was described above, those skilled in the art to which the present invention pertains will understand that the present invention may be implemented in another concrete form without changing the technical idea or essential features of the present invention.

For example, although the above description was given based on the members directly related to oxygen dissolution, filters configured to supply filtered water to the water tank 10 may be added. In such a modification of the embodiment, a water bottle configured to supply bottled water to the water tank 10 may be added in the apparatus.

In addition, although the diameter of the outer edge of each of the water collection trays 220a to 220f in the dissolution tank 60 was described as being equal to the inner diameter of the dissolution tank 60 in the above description, the diameter of the outer edge of each of the water collection trays 220a to 220f is not necessarily equal to the inner diameter of the dissolution tank 60 and may be slightly less than the inner diameter of the dissolution tank. Even in this case, however, it is preferable for the diameter of the outer edge of each of the dispersion trays 210a to 210g to be less than the diameter of the outer edge of each of the water collection trays 220a to 220f such that most water flowing downwards along the inclined surface of each of the dispersion trays 210a to 210g can fall to a corresponding one of the water collection trays 220a to 220f.

On the other hand, although water in the water tank 10 and oxygen in the oxygen source 30 are introduced into the dissolution tank 60 by the circulation pump 20 in the state in which the water and the oxygen are mixed with each other by the mixer 40 in the above description, water in the water tank 10 and oxygen in the oxygen source 30 may be separately introduced into the dissolution tank 60 without the mixer 40 in a modified embodiment.

It should be understood that the above embodiments are illustrative, not restrictive, in all aspects. It should be interpreted that the scope of the present invention is defined by the appended claims, not the detailed description, and all changes and modifications derived from the meaning and scope of the claims and equivalent concepts thereto fall within the scope of the present invention.

The invention claimed is:

1. A high-concentration oxygenated water generation apparatus configured to dissolve oxygen from an oxygen source in water stored in a water tank, the high-concentration oxygenated water generation apparatus comprising:
   a circulation pump connected to an outlet of the water tank such that fluid flow is possible;
   a dissolution tank connected to the circulation pump and the oxygen source such that fluid flow is possible, the dissolution tank being configured to receive the water stored in the water tank and the oxygen from the oxygen source through the circulation pump and to discharge oxygenated water having increased dissolved oxygen concentration in the water;
   a pressure dissolution unit connected to the dissolution tank such that fluid flow is possible, the pressure dissolution unit having a wound coil part or a plurality of bent parts, the pressure dissolution unit being configured to further increase the dissolved oxygen concentration of the oxygenated water and to discharge high-concentration oxygenated water; and
   a dispenser water tank connected to the pressure dissolution unit and the water tank such that fluid flow is possible, the dispenser water tank being configured to receive the high-concentration oxygenated water from the pressure dissolution unit, to store the high-concentration oxygenated water, and to provide the high-concentration oxygenated water to a user, wherein the dissolution tank comprises:
a plurality of dispersion trays, each of the dispersion trays having an inclined surface extending outwards and downwards; and
a plurality of water collection trays, each of the water collection trays having an inclined surface extending inwards and downwards, each of the water collection trays being provided at a lower end thereof with a through-hole,
the plurality of dispersion trays and the plurality of water collection trays are alternately disposed in an upward-downward direction, whereby contact area and contact time between water and oxygen are maximized, and impact applied to a mixture of water and oxygen due to collision by gravity and degassing due thereto are minimized.

2. The high-concentration oxygenated water generation apparatus according to claim 1, further comprising a mixer connected to the circulation pump, the mixer being configured to disperse the oxygen from the oxygen source in a water flow in an air bubble form to generate a mixture of water and oxygen and to supply the mixture of water and oxygen to the dissolution tank.

3. The high-concentration oxygenated water generation apparatus according to claim 1, wherein each of at least some of the plurality of dispersion trays has a conical shape.

4. The high-concentration oxygenated water generation apparatus according to claim 3, wherein each of at least some of the plurality of water collection trays has a funnel shape and is provided at the lower end thereof with the through-hole.

5. The high-concentration oxygenated water generation apparatus according to claim 1, wherein an outer edge of each of the plurality of water collection trays is in tight contact with an inner wall of the dissolution tank.

6. The high-concentration oxygenated water generation apparatus according to claim 1, wherein the pressure dissolution unit comprises:
a pipe diameter decrease reducer having a first inlet and a first outlet enlarged so as to be larger than the first inlet;
a pipe diameter increase reducer having a second inlet and a second outlet reduced so as to be smaller than the second inlet; and
a pressure dissolution pipe disposed between the first outlet of the pipe diameter decrease reducer and the second inlet, the pressure dissolution pipe having the wound coil part or the plurality of bent parts, the pressure dissolution pipe being configured to further increase the dissolved oxygen concentration under pressure higher than pressure in the first inlet and pressure in the second outlet.

7. The high-concentration oxygenated water generation apparatus according to claim 1, further comprising a stabilization tube disposed between the dispenser water tank and the water tank, the stabilization tube being configured to inhibit degassing of the high-concentration oxygenated water stored in the dispenser water tank in a state in which the circulation pump is not operated using a weight of water.

8. The high-concentration oxygenated water generation apparatus according to claim 7, wherein the stabilization tube comprises:
a first stabilization tube connected to the dispenser water tank, the first stabilization tube having an inlet formed at an upper end thereof and an outlet formed at a lower side thereof; and
a second stabilization tube connected to the first stabilization tube, the second stabilization tube having an inlet formed at a lower side thereof and an outlet formed at an upper side thereof.

9. The high-concentration oxygenated water generation apparatus according to claim 8, wherein the first stabilization tube has a shock absorption tray provided under the inlet of the first stabilization tube, the shock absorption tray being configured to prevent free downward falling of high-concentration oxygenated water introduced through the inlet of the first stabilization tube and allow the high-concentration oxygenated water to flow downwards along an inner wall of the first stabilization tube.

10. The high-concentration oxygenated water generation apparatus according to claim 4, wherein an outer edge of each of the plurality of water collection trays is in tight contact with an inner wall of the dissolution tank.

* * * * *